(12) United States Patent
Zhang et al.

(10) Patent No.: US 10,321,140 B2
(45) Date of Patent: Jun. 11, 2019

(54) METHOD OF VIDEO CODING FOR CHROMA COMPONENTS

(71) Applicant: MediaTek Singapore Pte. Ltd., Singapore (SG)

(72) Inventors: Xianguo Zhang, Beijing (CN); Kai Zhang, Beijing (CN); Jicheng An, Beijing (CN)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 15/541,802

(22) PCT Filed: Jan. 7, 2016

(86) PCT No.: PCT/CN2016/070331
§ 371 (c)(1),
(2) Date: Jul. 6, 2017

(87) PCT Pub. No.: WO2016/115981
PCT Pub. Date: Jul. 28, 2016

(65) Prior Publication Data
US 2017/0366818 A1    Dec. 21, 2017

(30) Foreign Application Priority Data

Jan. 22, 2015 (WO) ................ PCT/CN2015/071341

(51) Int. Cl.
*H04N 19/186* (2014.01)
*H04N 19/103* (2014.01)
(Continued)

(52) U.S. Cl.
CPC ......... *H04N 19/186* (2014.11); *H04N 19/103* (2014.11); *H04N 19/11* (2014.11);
(Continued)

(58) Field of Classification Search
CPC .... H04N 19/186; H04N 19/11; H04N 19/159; H04N 19/593; H04N 19/103; H04N 19/176; H04N 19/44; H04N 19/70
See application file for complete search history.

(56) References Cited

U.S. PATENT DOCUMENTS

| | | | |
|---|---|---|---|
| 7,646,815 B2 | 1/2010 | Dattani et al. | |
| 9,674,529 B2 | 6/2017 | Yang et al. | |

(Continued)

FOREIGN PATENT DOCUMENTS

| | | | |
|---|---|---|---|
| CN | 101222645 A | 7/2008 | |
| CN | 103096051 A | 5/2013 | |

(Continued)

OTHER PUBLICATIONS

X. Zhang, C. Gisquet, E. François, F. Zou and O. C. Au, "Chroma Intra Prediction Based on Inter-Channel Correlation for HEVC," in IEEE Transactions on Image Processing, vol. 23, No. 1, pp. 274-286, Jan. 2014.doi: 10.1109/TIP.2013.2288007 (Year: 2014).*

(Continued)

*Primary Examiner* — Maria E Vazquez Colon
(74) *Attorney, Agent, or Firm* — Wolf, Greenfield & Sacks, P.C.

(57) ABSTRACT

A method for chroma Intra prediction allowing different chroma blocks in a coding unit to use separate chroma Intra prediction modes is disclosed. The method selects chroma Intra prediction modes for a first chroma block and one or more non-first chroma blocks in a current color block, where the first chroma block and at least one non-first chroma block use separate chroma Intra prediction modes. The method may comprise determining candidate mode sets for the first chroma block and the non-first chroma blocks. The method may also comprise signaling information of the chroma Intra prediction modes selected for the first chroma block and said one or more non-first chroma blocks. Fur- (Continued)

thermore, a method of chroma Intra prediction using one or more cross-chroma linear model Intra prediction modes is disclosed for improving coding efficiency of chroma Intra prediction.

10 Claims, 6 Drawing Sheets

(51) Int. Cl.
*H04N 19/593* (2014.01)
*H04N 19/11* (2014.01)
*H04N 19/159* (2014.01)
*H04N 19/176* (2014.01)
*H04N 19/44* (2014.01)
*H04N 19/70* (2014.01)

(52) U.S. Cl.
CPC ......... *H04N 19/159* (2014.11); *H04N 19/176* (2014.11); *H04N 19/44* (2014.11); *H04N 19/593* (2014.11); *H04N 19/70* (2014.11)

(56) References Cited

U.S. PATENT DOCUMENTS

| | | | |
|---|---|---|---|
| 2011/0032987 A1 | 2/2011 | Lee et al. | |
| 2014/0098862 A1* | 4/2014 | Yang | H04N 19/593 375/240.12 |
| 2016/0373765 A1 | 12/2016 | Zhang et al. | |
| 2017/0359597 A1* | 12/2017 | Budagavi | H04N 19/11 |

FOREIGN PATENT DOCUMENTS

| | | |
|---|---|---|
| CN | 103096055 A | 5/2013 |
| CN | 103220508 A | 7/2013 |
| CN | 103227917 A | 7/2013 |
| CN | 103260018 A | 8/2013 |
| WO | WO 2012/128453 A1 | 9/2012 |
| WO | WO 2014/204584 A1 | 12/2014 |

OTHER PUBLICATIONS

Chen et al. ("Non-RCE1: Multiple LM Chroma modes", Document of Joint Collaborative Team on Video Coding, JCTVC-M0116, Apr. 2013).*
International Search Report dated Mar. 24, 2016, issued in application No. PCT/CN2016/070331.
International Search Report and Written Opinion dated Oct. 28, 2015 in connection with International Application No. PCT/CN2015/071341.
International Preliminary Report on Patentability dated Aug. 3, 2017 in connection with International Application No. PCT/CN2015/071341.
International Search Report and Written Opinion dated Nov. 3, 2015 in connection with International Application No. PCT/CN2015/071460.
International Preliminary Report on Patentability dated Aug. 3, 2017 in connection with International Application No. PCT/CN2015/071460.
Written Opinion dated Mar. 24, 2016 in connection with International Application No. PCT/CN2016/070331.
International Preliminary Report on Patentability dated Aug. 3, 2017 in connection with International Application No. PCT/CN2016/070331.

* cited by examiner

Top-Only

Luma block

Chroma block

METHOD OF VIDEO CODING FOR CHROMA COMPONENTS

CROSS REFERENCE TO RELATED APPLICATIONS

This Application is a national stage filing under 35 U.S.C. § 371 of International Patent Application Serial No. PCT/CN2016/070331, filed Jan. 7, 2016, entitled "METHOD OF VIDEO CODING FOR CHROMA COMPONENTS". This Application also claims priority to PCT Patent Application, Serial No. PCT/CN2015/071341, filed on Jan. 22, 2015, entitled "METHODS FOR CHROMA COMPONENT CODING WITH SEPARATE INTRA PREDICTION MODE" and PCT Patent Application, Serial No. PCT/CN2015/071460, filed on Jan. 23, 2015, entitled "ADDITIONAL INTRA PREDICTION MODES USING CROSS-CHROMA-COMPONENT PREDICTION". The PCT Patent Applications are hereby incorporated by reference in their entireties.

TECHNICAL FIELD

The present invention relates to video coding. In particular, the present invention relates to coding techniques associated with prediction for chroma components to explore correlation between chroma components.

BACKGROUND

Motion compensated inter-frame coding has been widely adopted in various coding standards, such as MPEG-1/2/4 and H.261/H.263/H.264/AVC. While motion-compensated inter-frame coding can effectively reduce bitrate for compressed video, Intra coding is required to compress the regions with high motion or scene changes. Besides, Intra coding is also used to process an initial picture or to periodically insert I-pictures or I-blocks for random access or for alleviation of error propagation. Intraprediction exploits the spatial correlation within a picture or within a picture region. In practice, a picture or a picture region is divided into blocks and the Intra prediction is performed on a block basis. Intra prediction for a current block can rely on pixels in neighboring blocks that have been processed. For example, if blocks in a picture or picture region are processed row by row first from left to right and then from top to bottom, neighboring blocks on the top and neighboring blocks on the left of the current block can be used to form Intra prediction for pixels in the current block. While any pixels in the processed neighboring blocks can be used for Intra predictor of pixels in the current block, very often only pixels of the neighboring blocks that are adjacent to the current block boundaries on the top and on the left are used.

The Intra predictor is usually designed to exploit spatial correlation and spatial features in the picture such as smooth area (DC mode), vertical line or edge, horizontal line or edge and diagonal line or edge as disclosed in the High Efficiency Video Coding (HEVC) standard. For Intra prediction, the reconstructed samples from neighboring blocks at the block boundaries of a current block are used as predictors for the samples in the current block. For example, various prediction directions have been defined in HEVC and FIG. 1 illustrates all the prediction directions. The relationship between variable intraPredAngle and the direction indices is shown in Table 1. Each Intra direction predicts the sample at position (x, y) of one Prediction Unit (PU) according to ((32−iFact)×ref[x+iIdx+1]+iFact×ref[x+iIdx+2]+16)>>5, when the direction is relatively vertical (i.e., intraPredAngle with a corresponding direction index greater than or equal to 18). In this expression, the array ref is the decoded line buffer above the current PU, iIdx is the floor position of the pixel in ref that position (x, y) points to along the Intra direction (i.e., iIdx=((y+1)×intraPredAngle)>>5), and iFact is the distance between the floor position and the pointed position (i.e., iFact=((y+1)×intraPredAngle)&31).

TABLE 1

| predModeIntra | 1 | 2 | 3 | 4 | 5 | 6 | 7 | 8 | 9 | 10 | 11 | 12 |
|---|---|---|---|---|---|---|---|---|---|---|---|---|
| intraPredAngle | — | 32 | 26 | 21 | 17 | 13 | 9 | 5 | 2 | 0 | −2 | −5 |
| predModeIntra | 13 | 14 | 15 | 16 | 17 | 18 | 19 | 20 | 21 | 22 | 23 | 24 |
| intraPredAngle | −9 | −13 | −17 | −21 | −26 | −32 | −26 | −21 | −17 | −13 | −9 | −5 |
| predModeIntra | 25 | 26 | 27 | 28 | 29 | 30 | 31 | 32 | 33 | 34 | | |
| intraPredAngle | −2 | 0 | 2 | 5 | 9 | 13 | 17 | 21 | 26 | 32 | | |

In the existing HEVC design, chroma components share the same chroma mode, which is selected from direct mode (DM), DC, Planar, VER (vertical), HOR (horizontal) and VER+8. DM mode has the highest priority and the shortest binarization length 1, and the other four modes have equal priority with binarization length equal to 3.

Other Intra prediction methods including linear-model (LM) for chroma Intra prediction and single depth Intra mode are also disclosed after the HEVC. Single depth Intra mode is disclosed in JCT3V-H0087 (Chen et al., *Single depth intra mode for 3D-HEVC*, Joint Collaborative Team on 3D Video Coding Extensions of ITU-T SG 16 WP 3 and ISO/IEC JTC 1/SC 29/WG 11 8th Meeting: Valencia, ES, 29 March-4 Apr. 2014, Document: JCT3V-H0087). According to JCT3V-H0087, the single depth Intra mode utilizes one predicted value from neighboring reconstructed samples as the prediction values for all inside samples without transmitting the prediction residuals. LM chroma Intra prediction are disclosed in JCTVC-L0240 (Kim, et al., *AHG7: The performance of extended intra chroma prediction for non 4:2:0 format*, Joint Collaborative Team on Video Coding (JCT-VC) of ITU-T SG 16 WP 3 and ISO/IEC JTC 1/SC 29/WG 11, 12th Meeting: Geneva, CH, 14-23 Jan. 2013, Document: JCTVC-L0240) and JCTVC-M0116 (JCTVC-M0116: Chet et al., *Non-RCE1: Multiple LM chroma modes*, Joint Collaborative Team on Video Coding (JCT-VC) of ITU-T SG 16 WP 3 and ISO/IEC JTC 1/SC 29/WG 11, 13th Meeting: Incheon, K R, 18-26 Apr. 2013, Document: JCTVC-M0116). LM chroma Intra prediction predicts chroma data from luma data using a linear model. LM chroma mode predicts chroma samples by using reconstructed luma samples with a linear model to improve the coding efficiency of HEVC. In the LM chroma Intra prediction mode, the chroma sample V in a current chroma block is predicted by its corresponding reconstructed luma sample $V_{col}$ of the coding unit according to a linear model. The predictor P for V can be represented by $$P = a \cdot V_{col} + b, \quad (1)$$

where a and b are LM parameters.

These LM parameters are derived from the reconstructed luma and chroma samples around the current block. Often, Linear Least Squares procedure is used to derive the LM parameters. After deriving the LM parameters, chroma predictors can be generated according to the linear model and the reconstructed luma samples of the current coding unit. For example, if the video format is YUV420 (also referred to as YCrCb 420), there are one 8×8 luma block and two 4×4 chroma blocks for each 8×8 coding unit as shown in FIG. 2, where each square corresponds to one sample. The reconstructed neighboring luma (i.e., Y) samples and the reconstructed neighboring chroma (i.e., Cr or Cb) samples, which are shown in circles, are used to derive respective LM parameters (210, 220). For the YCrCb 420, the chroma position is located between the two vertical luma samples. Therefore, an average value between every two vertical luma samples at the left block boundary is used to derive the LM parameters. At the top block boundary, in order to reduce the line buffer requirement, one of every two samples immediately above the block boundary is used to derive the LM parameters. After the LM parameters are derived, the derived LM parameters are used to form respective predictors (i.e., Cr or Cb predictors) based on reconstructed luma samples in the current coding unit. The locations of the 4×4 luma samples of the current coding unit for predicting the 4×4 chroma samples of the current coding unit are shown in FIG. 2, where the sample at each location corresponds to the average of two consecutive luma samples in the vertical direction.

While the neighboring samples for deriving the LM model are from the top boundary and the left boundary as shown in FIG. 2, the neighboring samples for deriving the LM model may also be selected from top side or left side only. FIGS. 3A-3C illustrate three LM chroma prediction modes, denoted as Top+Left LM mode, Left-Only LM mode and Top-Only LM mode. There modes are collectively referred to as Multi-LM chroma modes, or simply referred as LM modes.

In the above Intra prediction methods mentioned, luma and chroma components can have different Intra prediction modes by using different syntax elements transmitted in the bitstream for luma and chroma coding blocks. However, different chroma components associated with one coding unit must utilize the same prediction mode. Table 2 illustrates the related syntax table for HEVC Intra prediction mode, where only one flag indicating chroma Intra prediction mode, i.e., intra_chroma_pred_mode[x0][y0] is utilized for both Cb and Cr chroma components as indicated by Note (2-1).

TABLE 2

| | Note |
|---|---|
| if( CuPredMode[ x0 ][ y0 ] = = MODE_INTRA ) { | |
| ...... | |
|   if( pcm_flag[ x0 ][ y0 ] ) { | |
| ...... | |
|   } else { | |
| ...... | |
|     intra_chroma_pred_mode[ x0 ][ y0 ] | (2-1) |
|     } | |
| } else { | |
| ...... | |
| } | |

Therefore, different chroma blocks associated with a same coding unit have to use the same chroma Intra prediction mode according to the existing practice. However, the different chroma blocks may have different characteristics. Forcing different chroma blocks associated with a coding unit to use the same chroma Intra prediction mode may degrade the potential coding performance. Therefore, it is desirable to develop new chroma Intra prediction techniques to improve performance.

SUMMARY

A method for chroma Intra prediction allowing different chroma blocks in a coding unit to use separate chroma Intra prediction modes is disclosed. The method selects chroma Intra prediction modes for a first chroma block and one or more non-first chroma blocks in a current color block, where the first chroma block and at least one non-first chroma block use separate chroma Intra prediction modes. The method may comprise determining candidate mode sets for the first chroma block and the non-first chroma blocks, where the chroma Intra prediction modes are selected from the candidate mode sets. Furthermore, the method may comprise signaling information of the chroma Intra prediction modes selected for the first chroma block and said one or more non-first chroma blocks.

In one embodiment, each chroma mode candidate set may include one or more chroma Intra prediction modes selected from Planar, DC, HOR, VER, Top+Left LM, Top-Only LM, Left-Only LM, DM, CB_DM and PRE_DM chroma Intra prediction modes. If CB_DM chroma Intra prediction mode is selected for a non-first chroma block, the non-first chroma block inherits a chroma Intra prediction mode selected for the first chroma block in the current color block. If PRE_DM chroma Intra prediction mode is selected for a non-first chroma block, the non-first chroma block inherits a chroma Intra prediction mode selected for a previous-component non-first chroma block of the non-first chroma block in the current color block.

In another embodiment, one or more syntax elements are signaled to indicate chroma Intra prediction modes selected for the multiple chroma blocks in the current color block, and the chroma Intra prediction modes include the two different chroma Intra prediction modes for the first chroma block and at least one non-first chroma block. For example, the first chroma block in the current color block uses HOR chroma Intra prediction mode and a second chroma block in the current color block uses VER chroma Intra prediction mode. In another example, when the multiple chroma blocks correspond to a CR chroma block and a CB chroma block and one syntax element is signaled to indicate chroma Intra prediction modes selected for the current color block, the syntax element having a value of 0 indicates that both the CR chroma block and the CB chroma block select DM chroma Intra prediction mode. In yet another example, when the multiple chroma blocks correspond to one first chroma block and one second chroma block, information related to second chroma Intra prediction mode selected for the second chroma block is signaled only when first chroma Intra prediction mode selected for the first chroma block belongs to a selected chroma Intra prediction mode set. Various chroma Intra prediction mode combinations for the first chroma block and a non-first chroma block are disclosed.

A method of video coding for chroma components using Intra prediction using cross-chroma linear model modes (LM_P modes) is also disclosed. The method determines chroma Intra prediction modes for the multiple chroma blocks, where the chroma Intra prediction modes include one or more LM_P modes. When one LM_P mode is selected for a current non-first chroma block, the method generates chroma Intra prediction data for the current non-first chroma block based on another chroma block in the current color block according to a linear model. Chroma Intra prediction coding can be applied to the current non-first chroma block using the chroma Intra prediction data. The LM_P modes consist of Top+Left LM_P mode, Top-Only LM_P mode and Left-Only LM_P mode.

In one embodiment, one or more syntax elements are signaled to indicate chroma Intra prediction modes selected from the chroma mode candidate lists for the multiple chroma blocks in the current color block, and where at least one chroma mode candidate list includes the LM_P modes. The LM_P modes can be binarized with equal-length codewords in a same way as for the LM modes. When all of the multiple chroma blocks share a same chroma Intra prediction mode and an LM_P mode is selected for the multiple chroma blocks, the chroma Intra prediction data for the first chroma block is generated according to a non-LM_P mode. In this case, the non-LM_P mode may correspond to Top+Left LM mode, DM mode or LM mode. One or more syntax element can be used to signal the non-LM_P mode selected.

When different chroma blocks share a same chroma Intra prediction mode, the LM_P modes can be added to the chroma mode candidate lists for the multiple chroma blocks in the current color block as additional chroma Intra prediction modes. The LM_P modes can be binarized with longer codewords than the LM modes. When difference chroma component blocks are allowed to use different chroma Intra prediction modes, the LM_P modes can be added to the chroma mode candidate lists as additional chroma Intra prediction modes only for the non-first chroma blocks. In this case, a codeword for Top+Left LM_P mode can be longer than Top+Left LM mode, but shorter than the LM modes.

When an LM_P mode is selected for the current non-first chroma block, linear model parameters of the linear model can be generated based on reconstructed chroma samples. For example, if the LM_P mode corresponds to Top+Left LM_P mode, above-row and left-column reconstructed samples of another chroma block and above-row and left-column reconstructed samples of the current non-first chroma block are used to derive the linear model parameters. Similar derivation process for the linear model parameters can be applied to Top-Only LM_P mode and LeftOnly LM_P mode. In another embodiment, when one LM_P mode is selected for the current non-first chroma block, one part of linear model parameters of the linear model can be generated based on reconstructed chroma samples and another part of linear model parameters of the linear model can be signaled in the video bitstream.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

As mentioned before, the conventional chroma Intra prediction coding always force all chroma blocks in a same coding unit to share a same chroma Intra prediction mode. Such approach may not always achieve the best performance. Accordingly, a method according to the present invention provides means for enabling different chroma components associated with a same coding unit to use separate Intra prediction modes. Therefore, different chroma components in a same coding unit may use different Intra prediction modes. The means for enabling different chroma components associated with a same coding unit to use separate Intra prediction modes includes selecting individual chroma Intra prediction mode for each chroma block associated with a same coding unit. With the capability to select separate chroma Intra prediction modes for different chroma blocks associated with a same coding unit, it provides the opportunity to achieve improved coding efficiency.

An exemplary procedure for chroma Intra prediction incorporating one embodiment of the present invention comprises the following steps. In step 1, candidate mode sets for different chroma components, including a first chroma component and one or more non-first chroma components are constructed. In step 2, flags are used to select and identify best prediction modes for these chroma components, where different chroma blocks in a coding unit may use different chroma Intra prediction modes. For example, the first chroma block in the current coding unit uses HOR chroma Intra prediction mode and the second chroma block in the current coding unit uses VER chroma Intra prediction mode. In step 3, the binarization result of these best prediction modes and information for the prediction residuals of these chroma components are coded. In the case that the color video includes one luma component and two chroma components, test results show that a system incorporating the embodiment can achieve more than 1% savings in bitrate for the second chroma component. A corresponding decoding process can be derived by reversing the encoding process.

Figure 1:
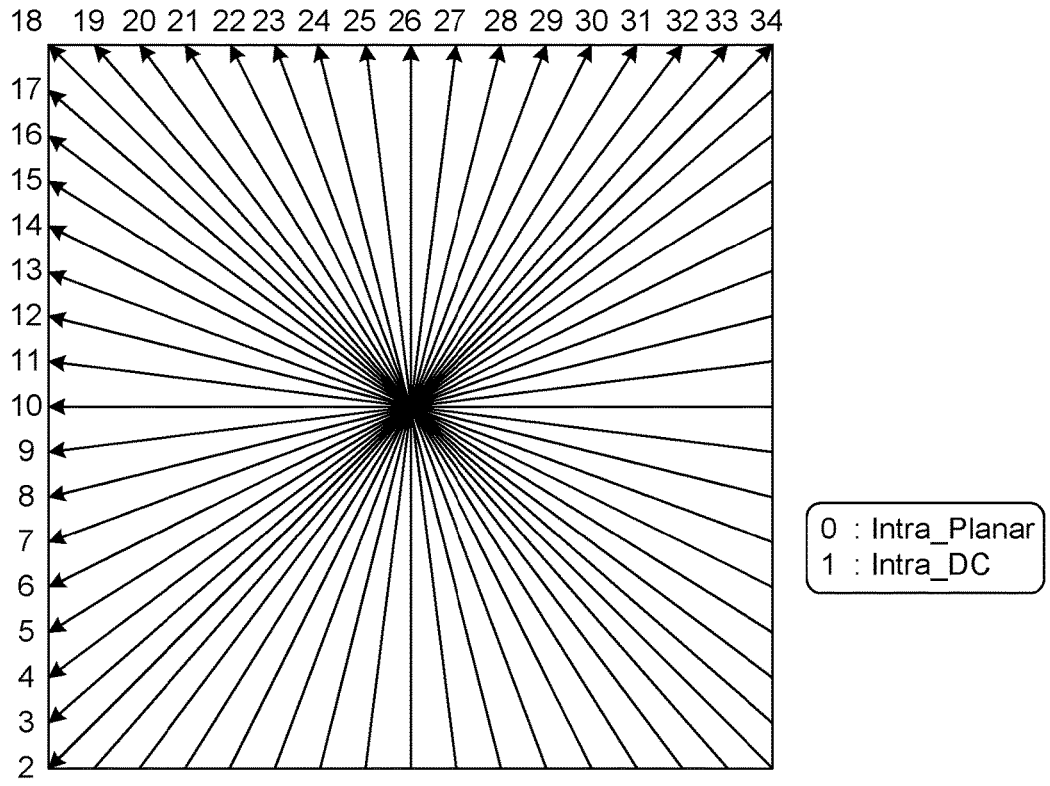
FIG. 1 illustrates the mapping between the Intra prediction directions and the Intra prediction modes according to the current HEVC (high efficiency video coding) standard.
Figure 2:
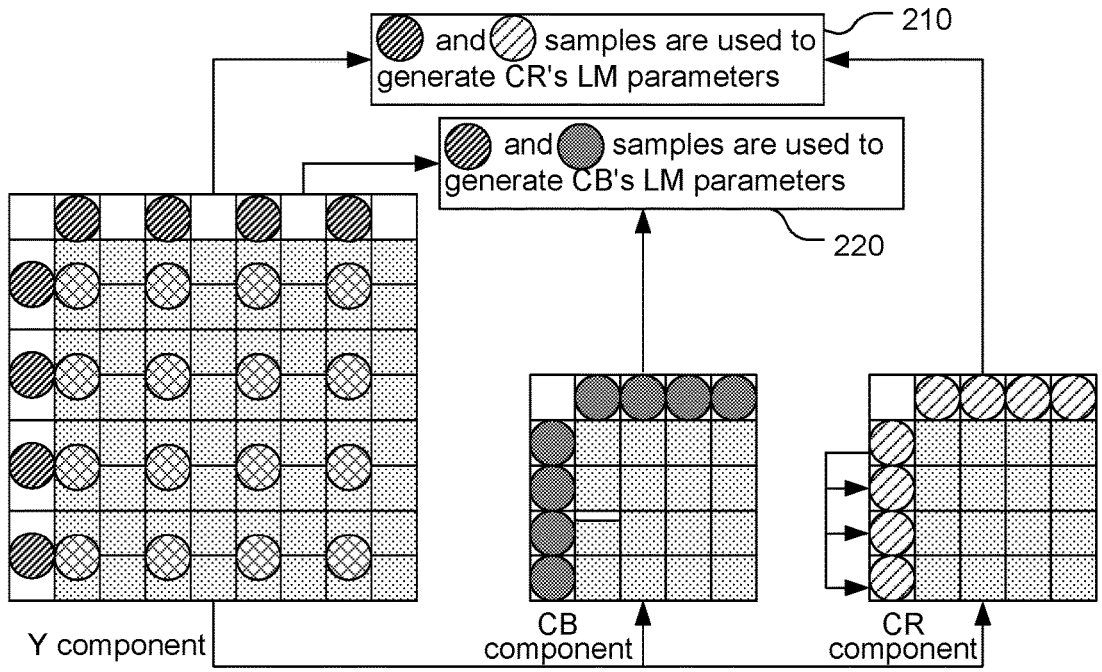
FIG. 2 illustrates an example of luma block and two chroma blocks for an 8×8 coding unit in the YUV420 format, where neighboring reconstructed samples are used to derive linear model parameters.
Figure 3A:
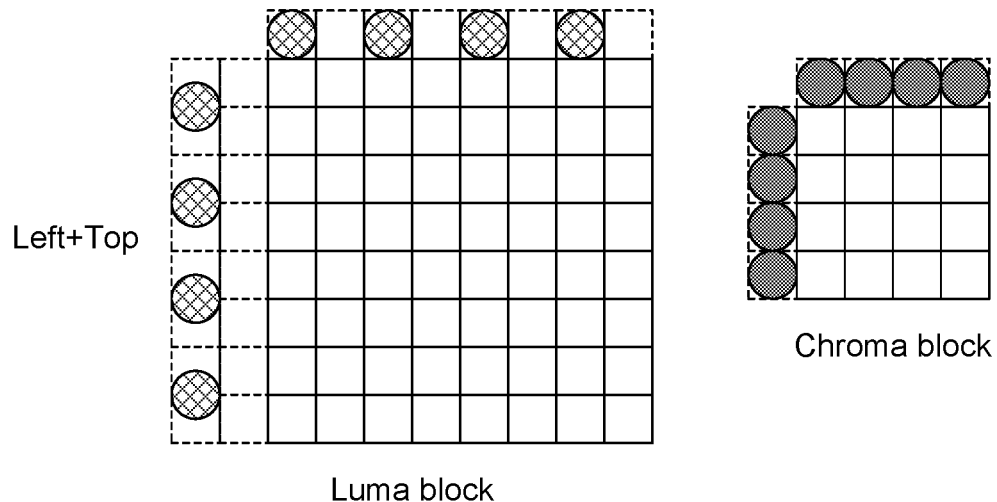
FIGS. 3A-3C illustrate three LM chroma prediction modes, denoted as Top+Left LM mode, Left-Only LM mode and Top-Only LM mode.
Figure 3B:
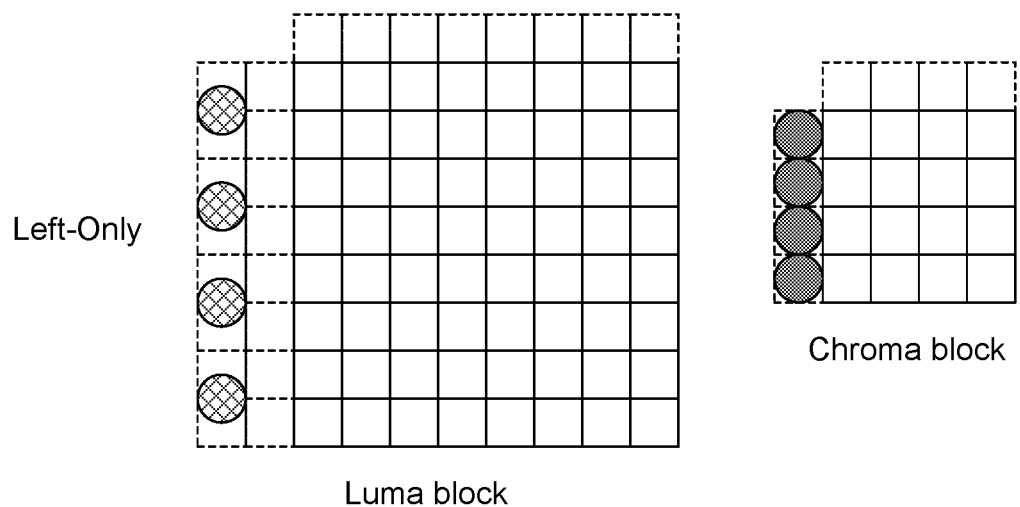
Figure 3C:
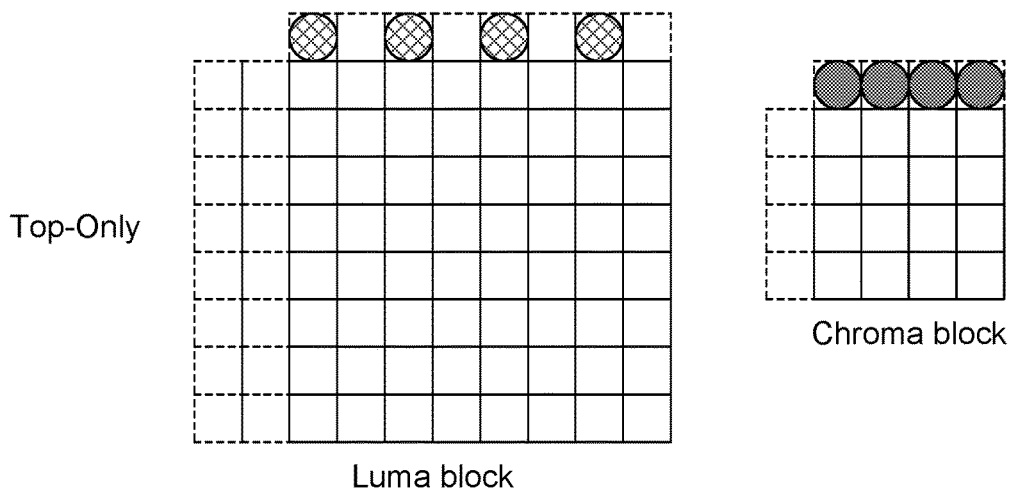
Figure 4:
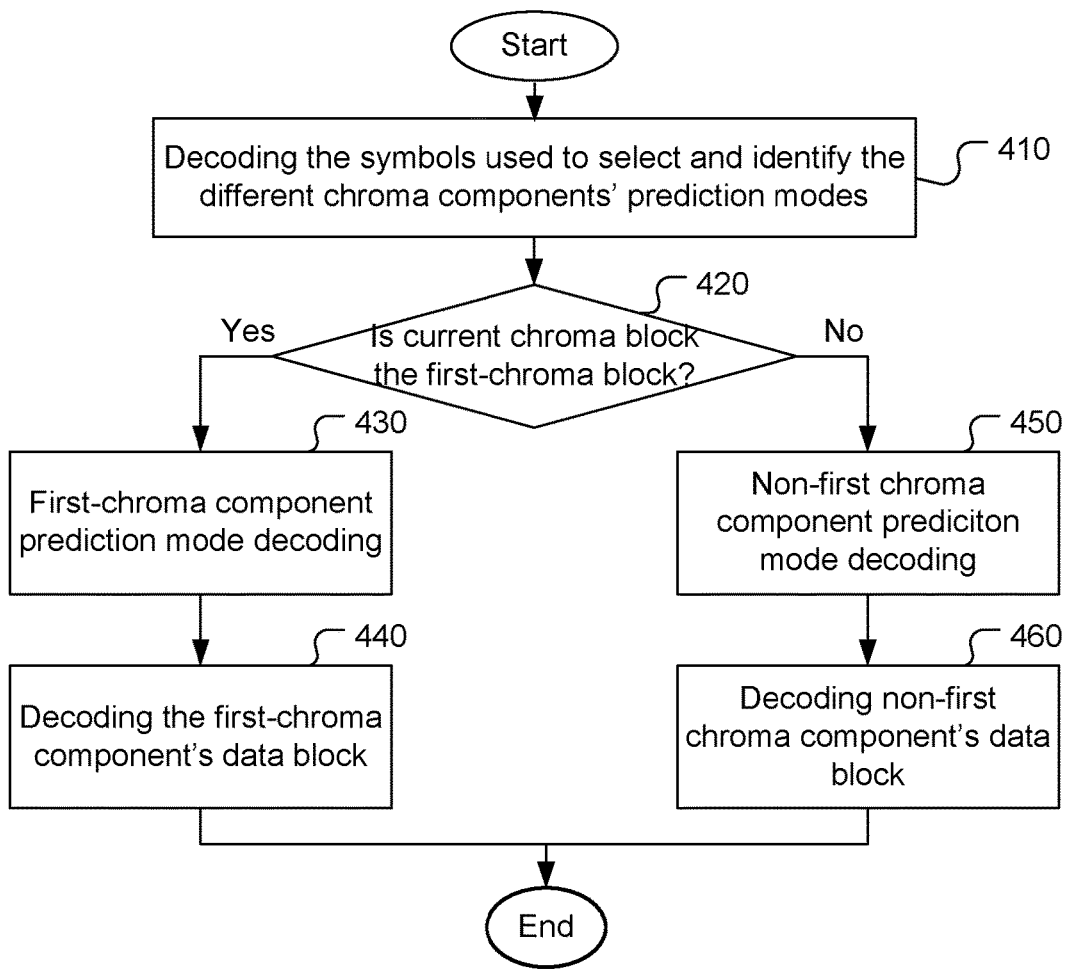
FIG. 4 illustrates an exemplary flowchart for a decoder system incorporating an embodiment of the present invention to decode Intra prediction coded chroma data that allows two different chroma blocks in a coding unit to use different chroma Intra prediction modes.

FIG. 4 illustrates an exemplary flowchart for a decoder system incorporating an embodiment of the present invention to decode Intra prediction coded chroma data that allows two different chroma blocks in a coding unit to use separate chroma Intra prediction modes. In step 410, the system decodes the symbols used to select and identify the different chroma components' prediction modes. The system checks if the current chroma block is a first-chroma block in step 420. If the result is "Yes", steps 430 and 440 are performed. If the result is "No", steps 450 and 460 are performed. In step 430, the prediction mode of the first-chroma component is decoded and in step 440, the samples of the first-chroma component are reconstructed. In step 450, the prediction mode of the non-first chroma component is decoded and in step 460, the samples of the non-first chroma component are reconstructed.

While an exemplary coding process is shown above to allow different chroma blocks in a coding unit to use separate chroma Intra prediction modes, the present invention is not limited to the specific arrangement of different steps. Other coding process may also be implemented to allow different chroma blocks in a coding unit to use separate chroma Intra prediction modes. For example, if a pre-defined candidate mode set is used for all chroma components, the step to construct the candidate mode sets for different chroma components may be performed implicitly.

There are various ways to construct the candidate mode sets for different chroma components. For example, the candidate mode set for the i-th chroma component includes M(i) number of modes selected from a group comprising, but not limited to, Planar, DC, HOR, VER, Top+Left LM, Top-Only LM, Left-Only LM, and DM chroma Intra prediction modes, where M(i) is larger than 0 for any index i.

In another example of constructing candidate mode sets for different chroma components, the non-first chroma component prediction mode set may include a special designed Intra prediction mode (e.g. CB_DM mode), where the non-first chroma component (e.g. Cr) inherits the Intra prediction mode of the first component (e.g. Cb).

In yet another example of constructing candidate mode sets for different chroma components, the non-first chroma component prediction mode set may include one special designed prediction mode (e.g. PRE_DM mode), where the k-th chroma component inherits the Intra prediction mode of the (k−1)-th chroma component.

There are also various ways for using flags to select and identify best prediction modes for these chroma components. For example, separate flags can be coded to identify the prediction modes of different chroma components.

In another example for using flags to select and identify best prediction modes for these chroma components, flags can be utilized to signal the combination of prediction modes of different chroma components. For example, using one flag equal to 0 to denote the prediction mode for both Cb and Cr components being DM (derived mode, also referred to as direct mode), which means chroma prediction modes are the same as luma prediction mode.

In yet another example for using flags to select and identify best prediction modes for these chroma components, flags for the second chroma component prediction mode is only transmitted when the prediction mode of the first component belongs to a selected set of prediction modes.

The Intra prediction mode of the second chroma component may be derived from the Intra prediction mode of the neighboring block of the second chroma component. For example, if the Intra prediction mode of the neighboring block of the second chroma component is HOR mode, the Intra prediction mode for the second chroma component can also be HOR mode.

If the prediction mode of the current chroma component is Cb_DM, the prediction mode of the first chroma component will be used by the current chroma component. If the Intra prediction mode of the current chroma component is PRE_DM, the prediction mode of the chroma component before the current chroma component will be used by the current chroma component.

There are various ways to code the binarization result of these best prediction modes and information for the prediction residuals of these chroma components. For example, the coding and transmission of the residual data of these chroma components can be either after the coding and transmission of their corresponding Intra prediction mode flags of these chroma components or after all the chroma Intra prediction mode flags for all chroma blocks are coded and transmitted.

In another example of coding the binarization result of these best prediction modes and information for the prediction residuals of these chroma components, there is no overlap between the arithmetic coding contexts utilized to signal the chroma Intra prediction mode of the i-th chroma component and those for the chroma Intra prediction mode of the j-th chroma component, when i is not equal to j.

In yet another example of coding the binarization result of these best prediction modes and information for the prediction residuals of these chroma components, there is no overlap between the arithmetic coding contexts utilized to signal the coding symbols for the prediction residuals of the i-th chroma component and the coding symbols for the prediction residuals of the j-th chroma component, when i is not equal to j.

In yet another example of coding the binarization result of these best prediction modes and information for the prediction residuals of these chroma components, the Cb_DM or PRE_DM mode of the non-first chroma component is signaled in the bitstream with the shortest binarization length, i.e., shortest codeword.

In yet another example of coding the binarization result of these best prediction modes and information for the prediction residuals of these chroma components, the DM mode of the non-first chroma component is not binarized with the shortest binarization length. For example, two symbols are utilized to signal a total of four candidate chroma modes (e.g. DM, DC, VER and HOR). In this example, all of the candidate chroma modes are binarized as fixed-length codewords, where the candidate chroma modes can be other chroma Intra prediction modes except for CB_DM, PRE_DM or any Multi-LM chroma mode.

In yet another example of coding the binarization result of these best prediction modes and information for the prediction residuals of these chroma components, except for the contexts for signalizing the candidate DM mode, CB_DM mode, PRE_DM mode or any Multi-LM chroma mode, there is no arithmetic coding with less-than-1 context utilized to signal other candidate chroma modes. For example, for chroma Intra prediction modes in a chroma mode candidate set for the first chroma block, the chroma Intra prediction modes except for DM chroma Intra prediction mode or any Multi-LM chroma Intra prediction mode are binarized coded using context adaptive arithmetic coding with at least one context; for chroma Intra prediction modes in a chroma mode candidate set for a non-first chroma block, the chroma Intra prediction modes except for CB_DM, PRE_DM and any Multi-LM chroma Intra prediction mode are binarized coded using context adaptive arithmetic coding with at least one context.

Besides the method of enabling different chroma components associated with a same coding unit to use individual Intra prediction modes to improve coding efficiency for chroma Intra prediction, another method is disclosed herein. The motion of the method is that the correlation between chroma components of a same coding unit may be more useful than the correlation between the luma component and a chroma component in a same coding unit. Accordingly, in another embodiment of the present invention, the method allows cross-chroma component Intra prediction to exploit the correlation between different chroma components in a same coding unit.

Figure 5:
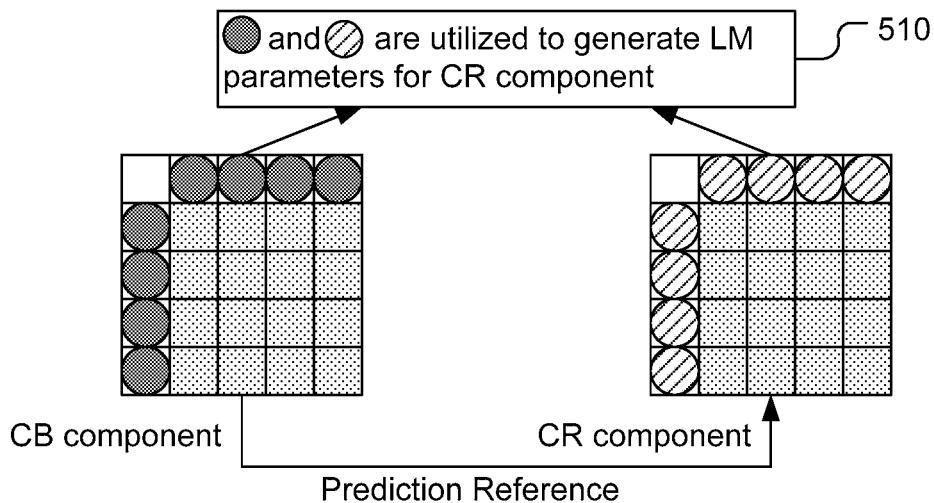
FIG. 5 illustrates an example of Top+Left LM_P mode, where a 4×4 Cb block is reconstructed before the corresponding 4×4 Cr block and the reconstructed 4×4 Cb block is used as reference data to predict the 4×4 Cr block.

According to the second embodiment of the present invention, new chroma Intra prediction modes, referred as cross-chroma component liner-model prediction modes (i.e., LM_P modes), are disclosed, where the LM_P modes utilize non-luma data as prediction reference to derive LM parameters and to generate the predictors for a current chroma block. The LM_P modes include Top+Left LM_P, Left-Only LM_P and Top-Only LM_P modes. One or more of these new chroma Intra prediction modes can be added to existing chroma Intra prediction mode candidates. An example of Top+Left LM_P mode is illustrated in FIG. 5, where a 4×4 Cb block is reconstructed before the corresponding 4×4 Cr block. Therefore, an embodiment of the present invention allows using reconstructed Cb block as reference data to generate predictors for the Cr block. The neighboring reconstructed left-column and the top-row of the Cb block and the neighboring reconstructed left-column and the top-row of the Cr block are used to derive the LM parameter (510) for the cross-chroma linear-model prediction mode.

A means for allowing the LM_P modes is disclosed herein as illustrated by an exemplary chroma Intra prediction coding procedure. The coding procedure for chroma blocks of an Intra coding unit utilizing LM_P modes can be divided into following steps. In step 1, one or more flags are coded for the chroma blocks to identify the prediction modes among the chroma mode candidate lists including the new LM_P modes. In step 2, Intra prediction data for the first-chroma block under LM_P modes is generated when chroma components share the same mode. In step 3, LM prediction data for non-first-chroma block coded in the LM_P mode is generated using other non-luma data as prediction reference.

Figure 6:
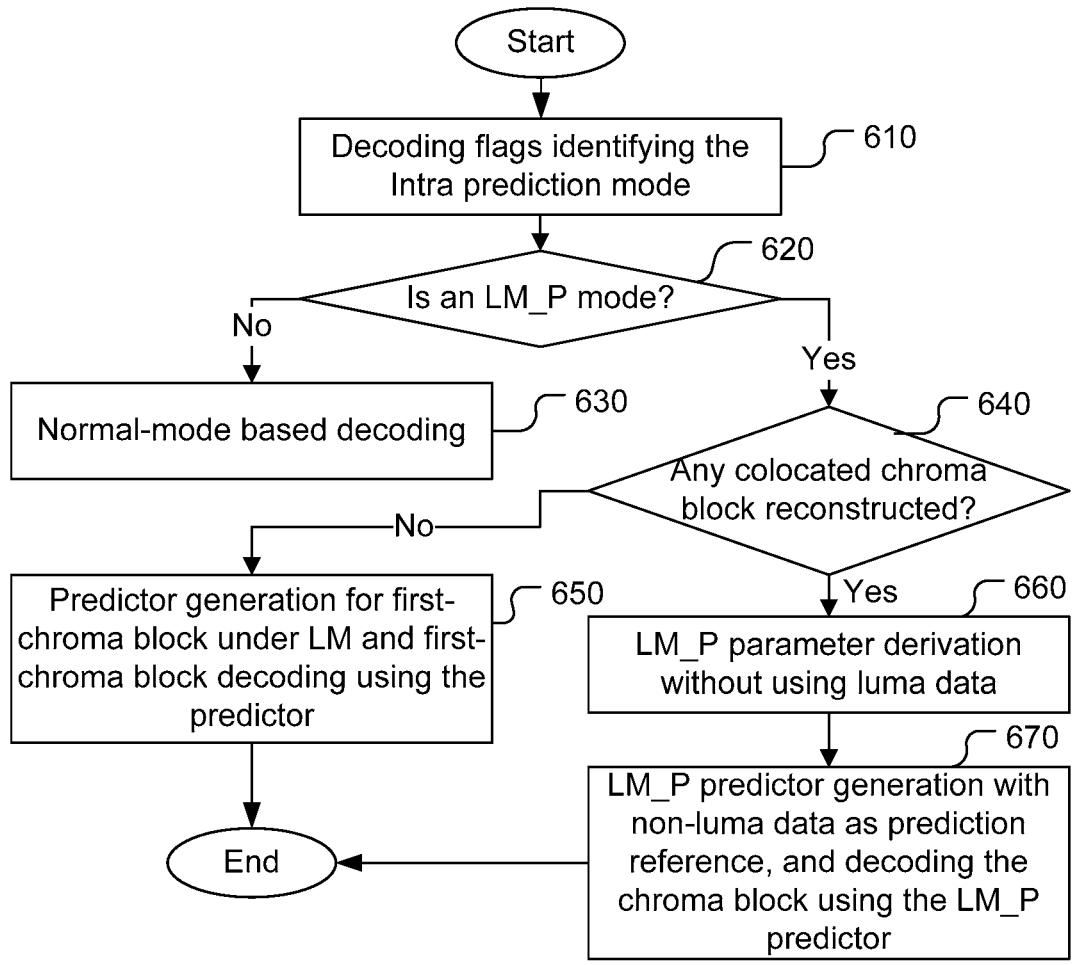
FIG. 6 illustrates an exemplary flowchart for a decoder system incorporating an embodiment of the present invention to decode Intra prediction coded chroma data that allows cross-chroma linear-model prediction modes (LM_P modes).

FIG. 6 illustrates an exemplary flowchart for a decoder system incorporating an embodiment of the present invention to decode Intra prediction coded chroma data that allows cross-chroma linear-model prediction modes (LM_P modes). In step 610, the system decodes one or more syntax elements to identify the Intra prediction modes. The system checks if the current Intra prediction mode is a cross-chroma liner-model prediction mode (LM_P mode) in step 620. If the result is "No", normal mode based decoding is applied as shown in step 630. If the result is "Yes", the system further checks if any collocated chroma block has been reconstructed in step 640. If the result is "No", the chroma block is decoded using an LM mode as shown in step 650. If the result is "Yes", steps 660 and 670 are performed. In step 660, the LM_P parameters are derived without using luma data. In step 670, the LM_P predictor is generated using non-luma data as prediction reference, and the chroma block is decoded using the LM_P predictor.

While an exemplary coding process is shown above to allow the cross-chroma component liner-model modes, the present invention is not limited to the specific arrangement of different steps. Other coding process may also be implemented to allow the cross-chroma component liner-model modes. For example, the flags for the chroma blocks to identify the prediction modes among the chroma mode candidate lists including the new LM_P modes may be determined implicitly instead of signaling explicitly.

Regarding the step 1, there are various ways to code the flags for the chroma blocks to identify the prediction modes among the chroma mode candidate lists including the new LM_P modes. For example, one or more LM_P modes are added to the chroma mode candidate list as additional modes if different chroma blocks share the same prediction mode flag.

In the second example for step 1, one or more LM_P modes are added to the chroma mode candidate list as additional modes for the non-first chroma block(s) when different chroma component blocks are allowed to use different prediction modes.

In the third example for step 1, LM_P modes are binarized with longer codewords than the LM modes in the chroma mode candidates including LM_P modes when all chroma components share the same mode.

In the fourth example for step 1, Top+Left LM_P mode is binarized with longer codewords than Top+Left LM mode, but with shorter codewords than the LM modes in the chroma mode candidates including LM_P modes when all different chroma components have different modes.

In the fifth example for step 1, LM_P modes can be binarized with equal-length codewords in a same way as the LM modes in the chroma mode candidates including LM_P modes.

In the sixth example for step 1, among the chroma mode candidates including LM_P modes, LM_P modes can be selected as one of the four chroma mode candidates (e.g., DC, Planar, LM, and LM_P) and binarized with equal-length symbols if all chroma components share the same mode.

There are also various ways to generate the Intra prediction data in step 2 for the first-chroma block coded in the LM_P modes when the chroma components share the same mode. In this case, there is no chroma reference data available for the first-chroma block. For example, when different chroma component blocks share the same prediction mode flag, under LM_P modes, the prediction data for the first chroma component block is generated the same as Top+Left LM mode by using the neighboring reconstructed luma data during LM parameter derivation and using the reconstructed luma data as prediction reference for the chroma components.

In the second example for step 2, when different chroma component blocks coded using the LM_P modes share the same prediction mode flag, the prediction data for the first chroma component block is generated by using the traditional DM mode, where the chroma prediction mode is derived from the luma prediction mode.

In the third example for step 2, when different chroma component blocks coded using the LM_P modes share the same prediction mode flag, the prediction data for the first chroma component block is generated by using the corresponding LM mode of the current LM_P mode. For example, when the current LM_P mode is Top+Left LM_P prediction mode that uses chroma samples as prediction reference, the first-chroma block should be predicted by Top+Left LM mode using luma samples as the prediction reference.

In the fourth example for step 2, when different chroma blocks coded using the LM_P modes share the same prediction mode flag, the prediction data for the first chroma component block is generated by selecting the a Intra prediction mode among the traditional chroma modes. In this case, one or more additional flags will be signalized to determine which one is selected.

Regarding step 3, there are various ways to generate LM prediction data for non-first-chroma block coded in the LM_P modes using other non-luma data as the prediction reference. For example, when a reconstructed previous-component chroma block ($V_{col}$) for the current coding unit exists and the previous-component chroma block is coded in the Top+Left LM_P mode, the above-row and left-column reconstructed samples of the current chroma block (C) and the reconstructed previous-component chroma block ($V_{col}$) can be used to derive the LM parameters (i.e., a and b in equation (1)).

In the second example for step 3, when a reconstructed previous-component chroma block ($V_{col}$) for the current coding unit exists and the previous-component chroma block is coded in the Top-Only LM_P mode, the above-row reconstructed samples of the current chroma block C and the reconstructed previous-component chroma block ($V_{col}$) can be used to derive the LM parameters (i.e., a and b in equation (1)).

In the third example for step 3, when are constructed previous-component chroma block ($V_{col}$) for the current coding unit exists and the previous-component chroma block is coded in the Left-Only LM_P mode, the left-column reconstructed samples of the current chroma block C and the reconstructed previous-component chroma block ($V_{col}$) can be used to derive the LM parameters (i.e., a and b in equation (1)).

In the fourth example for step 3, when a reconstructed previous-component chroma block ($V_{col}$) for the current coding unit exists and the previous-component chroma block is coded in the LM_P modes, samples in the reconstructed previous-component chroma block ($V_{col}$) are utilized to generate the predictor P of the current chroma block from the derived LM parameters a and b according to equation (1).

In the fourth example for step 3, when a reconstructed previous-component chroma block ($V_{col}$) for the current coding unit exists and the previous-component chroma block is coded in the LM_P modes, one part of linear model parameters of the linear model can be generated based on reconstructed chroma samples and another part of linear model parameters of the linear model can be signaled in the video bitstream. For example, LM parameter a can be generated based on reconstructed chroma samples and LM parameters b can be signaled in the video bitstream.

Figure 7:
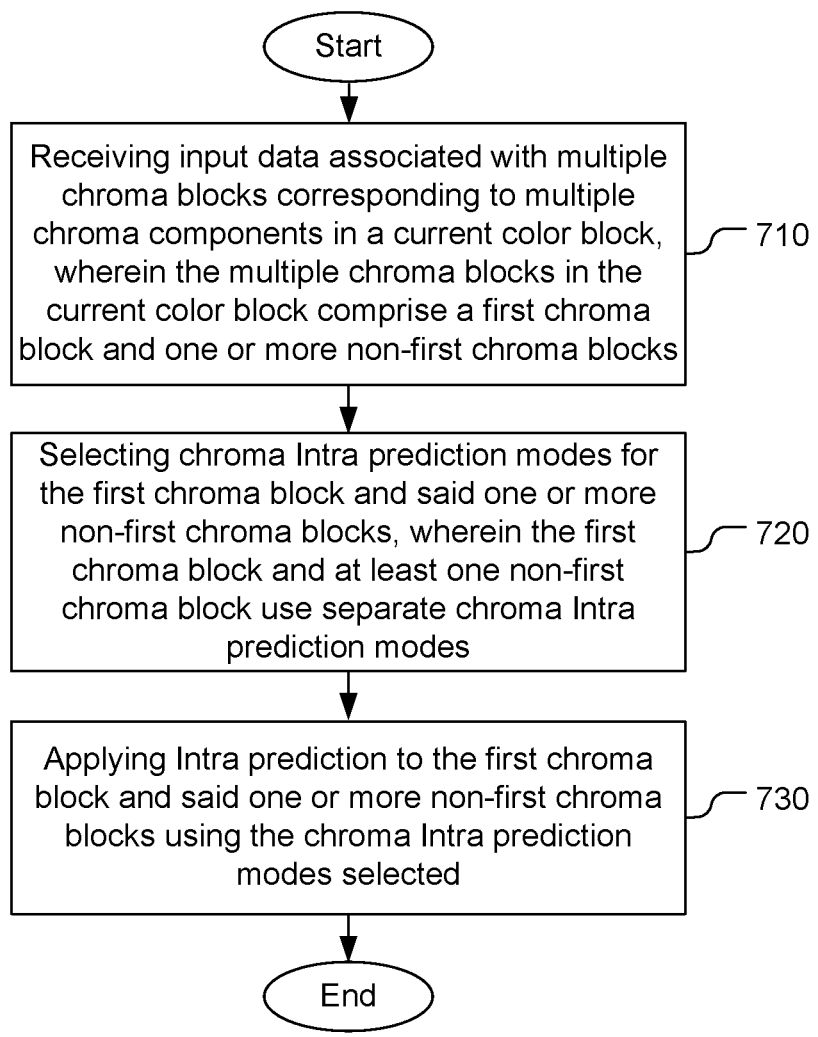
FIG. 7 illustrates an exemplary flowchart for a video coding system that allows different chroma component to use separate coding modes according to an embodiment of the present invention.

FIG. 7 illustrates an exemplary flowchart for a video coding system that allows different chroma component to use separate coding modes according to an embodiment of the present invention. Input data associated with multiple chroma blocks corresponding to multiple chroma components in a current color block is received in step 710, where the multiple chroma blocks in the current color block comprise a first chroma block and one or more non-first chroma blocks. Chroma Intra prediction modes for the first chroma block and said one or more non-first chroma blocks are selected in step 720, where the first chroma block and at least one non-first chroma block use separate chroma Intra prediction modes. Intra prediction is applied to the first chroma block and said one or more non-first chroma blocks using the chroma Intra prediction modes selected in step 730.

Figure 8:
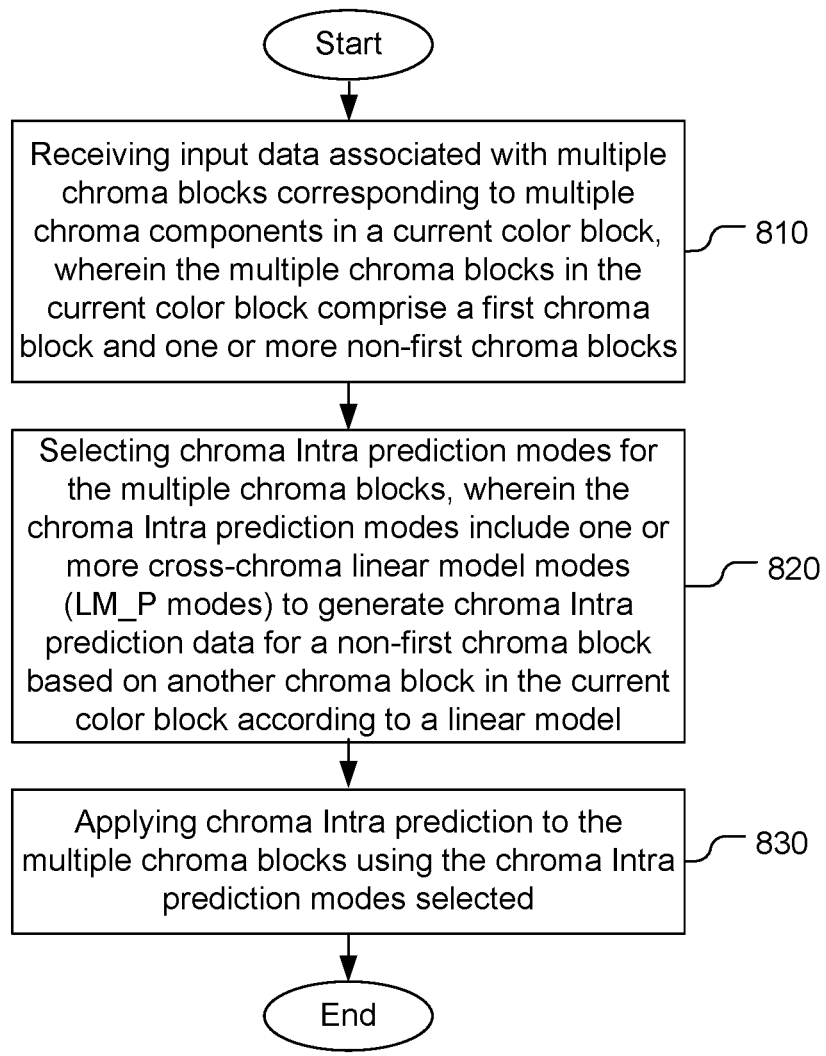
FIG. 8 illustrates an exemplary flowchart for a video coding system that allows cross-chroma linear-model prediction modes according to an embodiment of the present invention.

FIG. 8 illustrates an exemplary flowchart for a video coding system that allows cross-chroma linear-model prediction modes according to an embodiment of the present invention. Input data associated with multiple chroma blocks corresponding to multiple chroma components in a current color block is received in step 810, where the multiple chroma blocks in the current color block comprise a first chroma block and one or more non-first chroma blocks. Chroma Intra prediction modes for the multiple chroma blocks are selected in step 820, where the chroma Intra prediction modes include one or more cross-chroma linear model modes (LM_P modes) to generate chroma Intra prediction data for a non-first chroma block based on another chroma block in the current color block according to a linear model. Chroma Intra prediction is applied to the multiple chroma blocks using the chroma Intra prediction modes selected in step 830.

The flowcharts shown above are intended to illustrate examples of improved chroma Intra prediction for a video encoder and a decoder incorporating embodiments of the present invention. A person skilled in the art may modify each step, re-arranges the steps, split a step, or combine the steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video decoding for chroma components using Intra prediction, the method comprising:
   receiving a video bitstream for coded video data;
   deriving, from the video bitstream, residual data associated with multiple chroma blocks corresponding to multiple chroma components in a current color block, wherein the multiple chroma blocks in the current color block comprise a first chroma block and one or more non-first chroma blocks;
   determining chroma Intra prediction modes from the video bitstream for the multiple chroma blocks in the current color block, wherein the chroma Intra prediction modes include one or more cross-chroma linear model modes (LM_P modes), and each LM_P mode of the one or more LM_P modes generates, independent of luma data, chroma Intra prediction data for a chroma block;
   when one LM_P mode of the one or more LM_P modes is selected for a current non-first chroma block of the multiple chroma blocks, generating the chroma Intra prediction data for the current non-first chroma block based on another chroma block in the current color block according to a linear model; and
   applying chroma Intra prediction decoding to the residual data associated with the current non-first chroma block to reconstruct the current non-first chroma block using the chroma Intra prediction data.

2. The method of claim 1, wherein said one or more LM_P modes comprises Top+Left LM_P mode, Top-Only LM_P mode, and Left-Only LM_P mode.

3. The method of claim 1, wherein one or more syntax elements are signaled to indicate chroma Intra prediction modes selected from one or more chroma mode candidate lists for the multiple chroma blocks in the current color block, and wherein at least one chroma mode candidate list includes said one or more LM_P modes.

4. The method of claim 3, wherein said one or more LM_P modes are binarized with equal-length codewords in a same way as LM modes in the one or more chroma mode candidate lists for the multiple chroma blocks in the current color block, wherein said one or more chroma mode candidate lists include said one or more LM_P modes.

5. The method of claim 3, wherein when all of the multiple chroma blocks share a same chroma Intra prediction mode and an LM_P mode is selected for the multiple chroma blocks, the chroma Intra prediction data for the first chroma block is generated according to a non-LM_P mode.

6. The method of claim 5, wherein the chroma Intra prediction data for the first chroma block is generated according to Top+Left LM mode, and wherein the chroma Intra prediction data for the first chroma block is generated by using neighboring reconstructed luma data to derive linear model parameters and using the reconstructed luma data in the current color block as prediction reference.

7. The method of claim 1, wherein when one LM_P mode is selected for the current non-first chroma block, linear model parameters of the linear model are generated based on reconstructed chroma samples.

8. The method of claim 1, wherein when one LM_P mode is selected for the current non-first chroma block, one part of linear model parameters of the linear model is generated based on reconstructed chroma samples and another part of the linear model parameters of the linear model is signaled in the video bitstream.

9. A method of video coding for chroma components using Intra prediction, the method comprising:
   receiving input data associated with multiple chroma blocks corresponding to multiple chroma components in a current color block, wherein the multiple chroma blocks in the current color block comprise a first chroma block and one or more non-first chroma blocks;
   selecting chroma Intra prediction modes for the multiple chroma blocks, wherein the chroma Intra prediction modes include one or more cross-chroma linear model modes (LM_P modes) to generate chroma Intra prediction data for a non-first chroma block based on another chroma block in the current color block according to a linear model, wherein each LM_P mode of the one or more LM_P modes generates, independent of luma data, the chroma Intra prediction data; and
   applying chroma Intra prediction to the multiple chroma blocks using the chroma Intra prediction modes selected.

10. The method of claim 1, wherein each LM_P mode of the one or more LM_P modes generates the chroma Intra prediction data for the chroma block without utilizing luma data as a prediction reference.

* * * * *